(12) United States Patent
Kim et al.

(10) Patent No.: US 9,804,677 B2
(45) Date of Patent: Oct. 31, 2017

(54) METHOD AND APPARATUS FOR CREATING VIRTUAL JOINT SENSATION

(71) Applicants: Korea Institute of Science and Technology, Seoul (KR); Center of Human-centered Interaction for Coexistence, Seoul (KR)

(72) Inventors: Do Ik Kim, Seoul (KR); Jung Min Park, Seoul (KR); Joong-Jae Lee, Seoul (KR)

(73) Assignees: Korea Institute of Science and Technology, Seoul (KR); Center Of Human-Centered Interaction For Coexistence, Seoul (KR)

( * ) Notice: Subject to any disclaimer, the term of this patent is extended or adjusted under 35 U.S.C. 154(b) by 3 days.

(21) Appl. No.: 15/015,330

(22) Filed: Feb. 4, 2016

(65) Prior Publication Data
US 2017/0228019 A1    Aug. 10, 2017

(51) Int. Cl.
*G06F 3/01*         (2006.01)

(52) U.S. Cl.
CPC .............. *G06F 3/016* (2013.01); *G06F 3/011* (2013.01)

(58) Field of Classification Search
CPC ................................ G06F 3/014; G06F 3/016
See application file for complete search history.

(56) References Cited

U.S. PATENT DOCUMENTS

| | | | | |
|---|---|---|---|---|
| 5,631,861 A * | 5/1997 | Kramer | ................... | G06F 3/011 414/5 |
| 9,030,307 B1 * | 5/2015 | Lee | ......................... | G06F 3/017 340/407.1 |
| 9,468,847 B2 * | 10/2016 | Bekri | .................... | A63F 13/245 |
| 2006/0142657 A1 * | 6/2006 | Quaid | .................... | A61N 1/372 600/424 |
| 2007/0091063 A1 * | 4/2007 | Nakamura | .............. | G06F 3/016 345/156 |
| 2016/0139666 A1 * | 5/2016 | Rubin | .................... | B25J 11/003 345/633 |
| 2016/0296345 A1 * | 10/2016 | Deshpande | .......... | A61H 1/0288 |

* cited by examiner

*Primary Examiner* — Lixi C Simpson
(74) *Attorney, Agent, or Firm* — Husch Blackwell LLP (57) ABSTRACT

An apparatus for creating virtual joint sensation is provided. The apparatus includes: a controlling part for creating control signals for controlling respective user's joints by referring to information on torques to be applied to the respective user's joints, wherein the information on the torques is acquired by analyzing information on forces to be applied to the user's body contacting a virtual object; and a torque-applying part, including one or more torque-applying units worn on the respective user's joints, for giving the torques to the respective user's joints by using the control signals.

16 Claims, 8 Drawing Sheets

METHOD AND APPARATUS FOR CREATING VIRTUAL JOINT SENSATION

FIELD OF THE INVENTION

The present invention relates to an apparatus, and a method for creating virtual joint sensation; and more particularly, to the apparatus, and the method for making a user feel sensation of grabbing an object even though the user actually does not by applying torques to the user's respective joints by controlling interactions between coils and magnets.

BACKGROUND OF THE INVENTION

When a user grabs an object, forces are exerted on a user's body by which the object is touched. That is, the forces are exerted on points of contact in the user's body. For example, when the user grabs the object, the forces work between the object and the user's hand. As the forces are delivered to fingers, the user may feel physical properties of the object. Herein, a force may be generated in a direction normal to a contact surface.

Even though the user actually does not grab the object, if the forces are applied to the user's body from the outside, the user may feel sensation as if the user grabbed the object. In other words, an apparatus for applying the forces to the user's body from the outside may enable the user to feel the sensation as if the user grabbed the object. Such apparatus for enabling the user to feel a virtual sensation may be widely used in a system for implementing a virtual world, etc. Haptic devices have been developed as tools for applying forces to users in the virtual world.

However, most of existing haptic devices apply forces to ends of the body of a user (e.g., fingertips as points of contact). Such existing haptic devices have problems as follows: the volume of the devices is increased and a pose of a hand or a finger becomes unnatural or limited.

Therefore, the present inventor came to develop a technology for applying torques to user's joints instead of applying forces to ends of the user's body by which an object is touched and relatively supporting the user's flexible motion.

SUMMARY OF THE INVENTION

It is an object of the present invention to solve all the aforementioned problems.

It is another object of the present invention to enable a user to feel a sensation of grabbing an object even though the user actually does not grab it by applying torques to the user's joints.

It is still another object of the present invention to provide an apparatus for creating a virtual sensation that does not limit the user's motions or puts relatively few limits on them.

In accordance with one aspect of the present invention, there is provided an apparatus for creating virtual joint sensation, including: a controlling part for creating control signals for controlling respective user's joints by referring to information on torques to be applied to the respective user's joints, wherein the information on the torques is acquired by analyzing information on forces to be applied to the user's body contacting a virtual object; and a torque-applying part, including one or more torque-applying units worn on the respective user's joints, for giving the torques to the respective user's joints by using the control signals.

In accordance with another aspect of the present invention, there is provided a method for creating virtual joint sensation, including steps of: (a) a controlling part creating control signals for controlling respective user's joints by referring to information on torques to be applied to the respective user's joints, wherein the information on the torques is acquired by analyzing information on forces to be applied to the user's body contacting a virtual object; and (b) a torque-applying part, including one or more torque-applying units worn on the respective user's joints, giving the torques to the respective user's joints by using the control signals.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
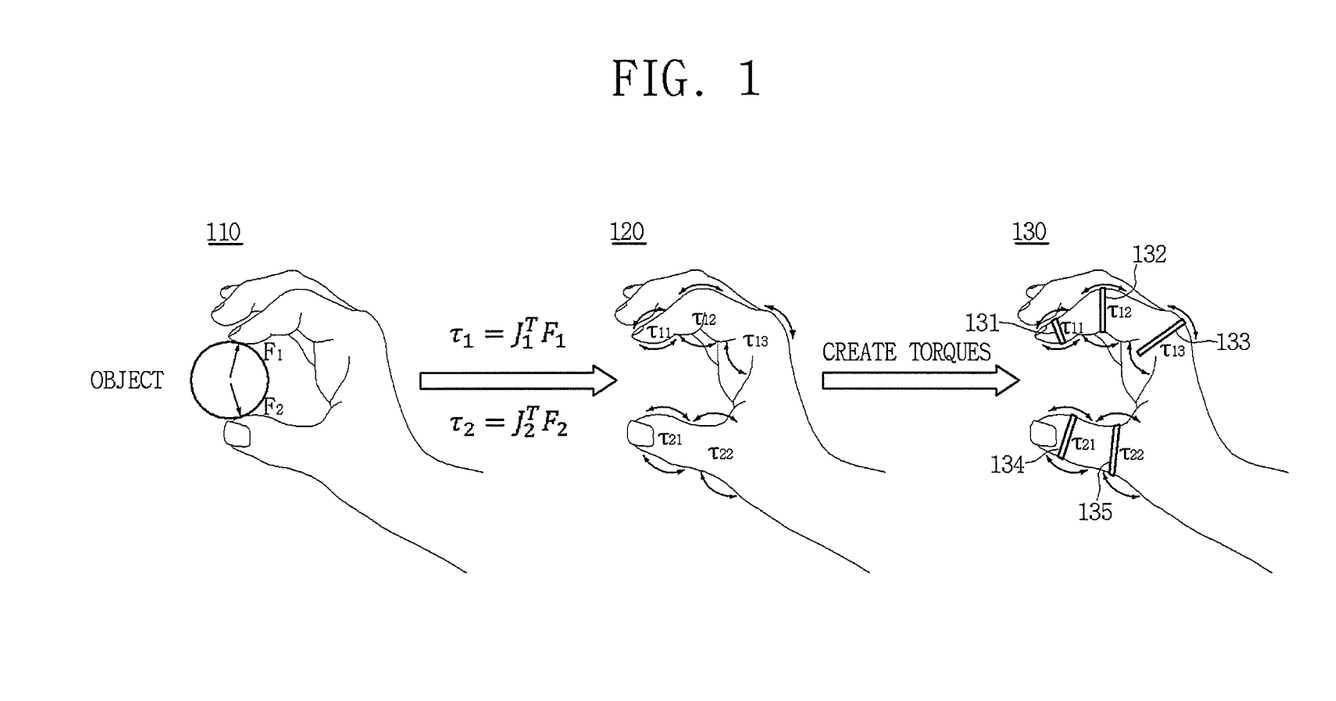
FIG. 1 is a drawing explaining a principle of creating joint sensation in accordance with one example embodiment of the present invention.

To allow those skilled in the art to the present invention to be carried out easily, the example embodiments of the present invention by referring to attached diagrams will be explained in detail as follows:

FIG. 1 is a drawing explaining a principle of creating joint sensation in accordance with one example embodiment of the present invention.

In accordance with one example embodiment of the present invention, as illustrated in a left drawing 110 in FIG. 1, when a user grabs an object, forces may be applied to the fingertips of the user's hand, i.e., a part of the hand at which the object is contacted. For example, when the user grabs the object, the forces work between the object and the user's hand, and as the forces are delivered to the fingers, the user may feel physical properties of the object. At the time, the forces may be generated in a direction perpendicular to a contact surface between the object and the user's body. In the left drawing 110 in FIG. 1, it is assumed that a force $F_1$ is applied to the tip of the user's index finger and the other force $F_2$ is applied to the tip of the user's thumb.

In accordance with one example embodiment of the present invention, the forces may be delivered to the user's joints. For the delivery, the forces applied to the fingertips may be converted to torques applied to respective joints of the finger. For example, if external forces are applied to ends, e.g., finger tips, of a robot, appropriate torques must be applied to joints of a robot, e.g., joints of the finger, to withstand the external forces.

In accordance with one example embodiment of the present invention, as explained in equations between the left drawing 110 of FIG. 1 and a central drawing 120 thereof, the applied forces may be converted into joint torque under the principle of virtual work. The conversion between a force F and torque $\tau$ may be made under the following equation 1:

$$\tau = J^T F \qquad \text{<Equation 1>}$$

where J may be a Jacobian matrix; and T may represent the matrix transpose. Forces $F_1$ and $F_2$ may be converted to torques $\tau_1$ and $\tau_2$, respectively, under Equations 2 and 3 below. The Jacobian matrix J may be defined by a kinematic motion equation with respect to points of contact, e.g., fingertips, and their corresponding joints. In the kinematic motion equation, a hydrostatic equation expressed as $J^T$ under the principle of virtual work, also, may be obtained. Herein, the hydrostatic equations may be equations between forces at the points of contact and torques at the respective joints.

$$\tau_1 = J_1^T F_1 \qquad \text{<Equation 2>}$$

$$\tau_2 = J_2^T F_2 \qquad \text{<Equation 3>}$$

In accordance with one example embodiment of the present invention, forces, for example, $F_1$ and $F_2$ illustrated in FIG. 1, may be six-value vectors consisting of linear forces in three directions and moments in three directions. However, herein, it is assumed that forces are three-value vectors consisting of linear forces in three directions for simplification. Besides, the number of individual finger joints may be decided by a finger model. Because structures of a thumb and an index finger, e.g., the number of joints of fingers, are different, the number of torques to be applied to the joints of fingers may be different depending on fingers. For example, a thumb may be modeled with three degrees of freedom, i.e., three independently moving joints, and the other fingers except the thumb may be modeled with four degrees of freedom, i.e., four independently moving joints. In accordance with another example embodiment of the present invention, a wrist joint, however, may be excluded from being modeled. Accordingly, as illustrated in FIG. 1, the thumb and the index finger may be modeled with two and three degrees of freedom, respectively. In other words, for a sensation generated when an object is grabbed, the thumb may be modeled with two degrees of freedom and the other fingers except the thumb may be enough to be modeled even with three degrees of freedom. As explained above, the forces generated at points of contact may be converted into torques of joints depending on the modeling. For example, for a thumb modeled with two joints, two torques applied respectively to the two joints may be considered and for an index finger modeled with three joints, three torques applied respectively to three joints may be taken account of. So to speak, the number of torques which is same as the number of modeled joints may be considered. Of course, torques corresponding to some joints may be excluded from those to be considered, as the case may be.

In accordance with one example embodiment of the present invention, just as illustrated in the central drawing 120 in FIG. 1, the torques applied to joints of an index finger may be expressed as three torques $\tau_{11}$, $\tau_{12}$, and $\tau_{13}$ and those applied to joints of a thumb may be expressed as two torques $\tau_{21}$ and $\tau_{22}$. In other words, torques $\tau_1$ and $\tau_2$ may be expressed as torques of the joints of the fingers as shown in equations 4 and 5 below.

$$\tau_1 = [\tau_{11} \tau_{12} \tau_{13}]^T \qquad \text{<Equation 4>}$$

$$\tau_2 = [\tau_{21} \tau_{22}]^T \qquad \text{<Equation 5>}$$

In other words, torques $\tau_1$ of three joints of the index finger may be calculated and torques $\tau_2$ of two joints of the thumb may be calculated. In case of the index finger, the torques of three joints may be calculated under the Equation 2 as stated above. In addition, $\tau$ which represents a matrix transpose in the Equations 4 and 5 is used to show that $\tau_1$ and $\tau_2$ are column vectors, respectively.

In accordance with one example embodiment of the present invention, under the hydrostatic equation expressed as $J^T$, if the index finger is modeled with three joints and only three linear forces as external forces are considered, a matrix $J_1$ may be a (3×3) matrix and the transpose matrix $J_1^T$ may also a (3×3) matrix. Besides, if the thumb is modeled with two joints and only three linear forces as external forces are considered, a matrix $J_2$ may be a (3×2) matrix and the transpose matrix $J_2^T$ may be a (2×3) matrix.

In accordance with one example embodiment of the present invention, even if the user does not actually grab a real object, an effect as if the user grabbed the real object may be provided by applying the torques to the user's joints. In other words, when torques are applied to the user's joints, the user may feel a sensation of grabbing the real object. Besides, a virtual sensation such as the volume and the elasticity of the object may be created by the torques applied to the user's joints.

In accordance with one example embodiment of the present invention, as shown in a right drawing 130 of FIG. 1, apparatuses 131, 132, 133, 134, and 135 for creating torques are disposed on joints. The apparatuses for creating the torques may be installed on individual joints and the installed apparatuses may apply torques to the joints respectively by generating pulling or pushing forces at the respective joints. For example, the apparatuses installed on five individual joints may apply torques to the individual joints by generating pulling or pushing forces on upper or lower parts of the joints. An example of generating pulling or pushing forces on upper or lower parts of the joints will be explained later.

Figure 2:
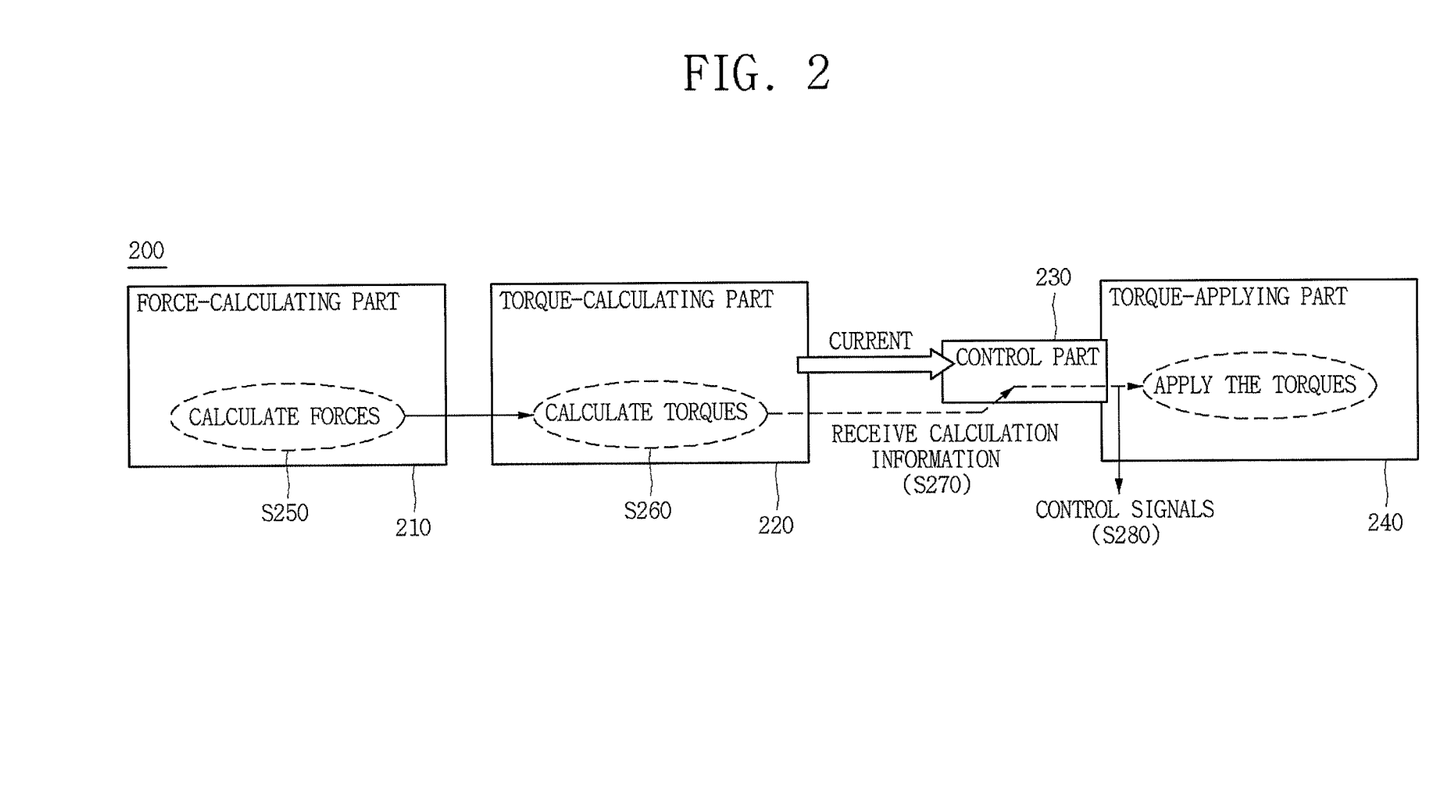
FIG. 2 is a drawing exemplarily a configuration of an apparatus for creating torques and a method for operating the apparatus in accordance with one example embodiment of the present invention.

FIG. 2 is a drawing exemplarily a configuration of an apparatus for creating torques and a method for operating it in accordance with one example embodiment of the present invention.

An apparatus 200 for creating torques may include a control part 230 and a torque-applying part 240. In accordance with one example embodiment of the present invention, the apparatus 200 for creating torques may also include a force-calculating part 210 and a torque-calculating part 220.

(i) First of all, in accordance with one example embodiment of the present invention, the force-calculating part 210 may calculate at least one force vector received from at least one point of contact to a virtual object if the user takes a motion of grabbing the virtual object at a step of S250. In other words, the force-calculating part 210 may calculate at least one force due to an object. At the time, the applied forces may depend on characteristics of the virtual object such as size or material.

In accordance with one example embodiment of the present invention, the force-calculating part 210 may be a physics engine or part of it. In addition to the calculation of the forces, the physics engine may handle interactions among virtual objects. For example, the force-calculating part 210 may calculate the forces by using mass-spring-damper (MSD) models and finite difference methods (FDM) with meshes. Based on the calculation of the forces, the sizes and the direction of the forces may be calculated.

Besides, the force-calculating part 210 in accordance with one example embodiment of the present invention may use a sensor (non-illustrated) attached to a mechanical device (such as a robot) capable of grabbing an actual object. The force-calculating part 210 may calculate the sizes and directions of the forces by using information transferred from the sensor when the mechanical device grabs the actual object.

(ii) Next, the torque-calculating part 220 may calculate torques corresponding to the forces at a step of S260. As explained above in FIG. 1, the forces generated at points of contact may be converted to the torques under the Principle of Virtual Work. In other words, the torques corresponding to the forces may be torques of values created by being converted under the Principle of Virtual Work. The torque-calculating part 220 may calculate the torques corresponding to the calculated forces by converting the forces to the torques under the Principle of Virtual Work.

The torque-calculating part 220 may provide information on currents depending on the calculated torques to the control part 230.

To calculate the forces and the torques, the force-calculating part 210 and the torque-calculating part 220 may use the aforementioned methods or equations by referring to FIG. 1.

(iii) In accordance with one example embodiment of the present invention, the control part 230 may receive calculation information to be used to create a control signal for controlling the torque-applying part 240, including one or more torque-applying units, at a step of S270. For example, the control part 230 may receive information on currents to be flowed through individual coils 310 (included in the torque-applying part 240 that will be explained later) from the aforementioned torque-calculating part 220. However, the apparatus 200 for creating the torques may directly calculate the forces and the torques, but, in another case, the apparatus 200 may also receive information on the currents corresponding to the forces or the torques from the outside without performing the steps of S250 and S260.

(iv) Next, the control part 230 in accordance with one example embodiment of the present invention may transmit individual control signals to the individual coils 310 included in the respective torque-applying units installed in individual joints by referring to the received calculation information and then support the individual joints to feel pulling or pushing forces at a step of S280. For example, the control part 230 may cause interactions between the coils and the magnets (pulling or pushing forces) by controlling the currents corresponding the individual coils 310 included in the respective torque-applying units by reference to information on the currents received from the torque-calculating parts 220. Accordingly, it may apply the torques to the user's joints. The torque-applying units may enable the user to feel a sensation of actually grabbing the object by applying the torques to the respective user's joints.

In accordance with one example embodiment of the present invention, the points of contact, for example, may be the user's fingertips and the joints may be the user's finger joints. The joints to which the torques are applied may be one or more joints moved by the forces applied to the points of contact among all the user's joints.

Meanwhile, as described above, the control part 230 may control directions and strengths of magnetic fields produced by the coils 310 to be explained later by controlling currents flowing through the individual coils 310 included in the respective torque-applying units worn on the individual joints, but it is not necessary for the control part 230 to control the currents. As another example, if the torques of the individual joints caused by the forces that a body of a user receives from a virtual object has been calculated by a separate computing device, the control part 230 may also perform a function of allowing the torques to be applied to the individual joints by delivering the control signals corresponding to the calculated torques to the respective torque-applying units.

At the time, as explained below, the respective torque-applying units worn on the individual joints could include respective pairs of coil and magnet but they are not limited to these. They would be certain apparatuses that may receive the control signals from the control part 230 and may apply the torques to joints depending on the control signals.

In accordance with one example embodiment of the present invention, the torque-applying part 240 may correspond to apparatuses for applying the aforementioned torques to the individual joints by referring to FIG. 1.

However, for convenience of explanation, explanation will be made below mainly on assumption that the respective torque-applying units include respective pairs of coil and magnet.

In accordance with one example embodiment of the present invention, the torque-applying part 240 may apply the torques to the user's joints through interactions between magnetic fields produced by the currents flowing through the coils and those generated by the magnets corresponding thereto. A method for applying the torques through the magnetic fields in accordance with one example embodiment of the present invention will be explained in details by referring to FIG. 3 as shown below.

There may be multiple torque-applying units. For example, the torque-applying units may be worn on the user's individual fingers. In addition, they may be worn on the individual finger joints. The apparatus 200 for creating a torque may generate torque to individual fingers of the user, i.e., individual finger joints of the user, through the multiple torque-applying part. The user may feel a sensation of grabbing an object by torque applied to the user's multiple finger joints.

Figure 3:
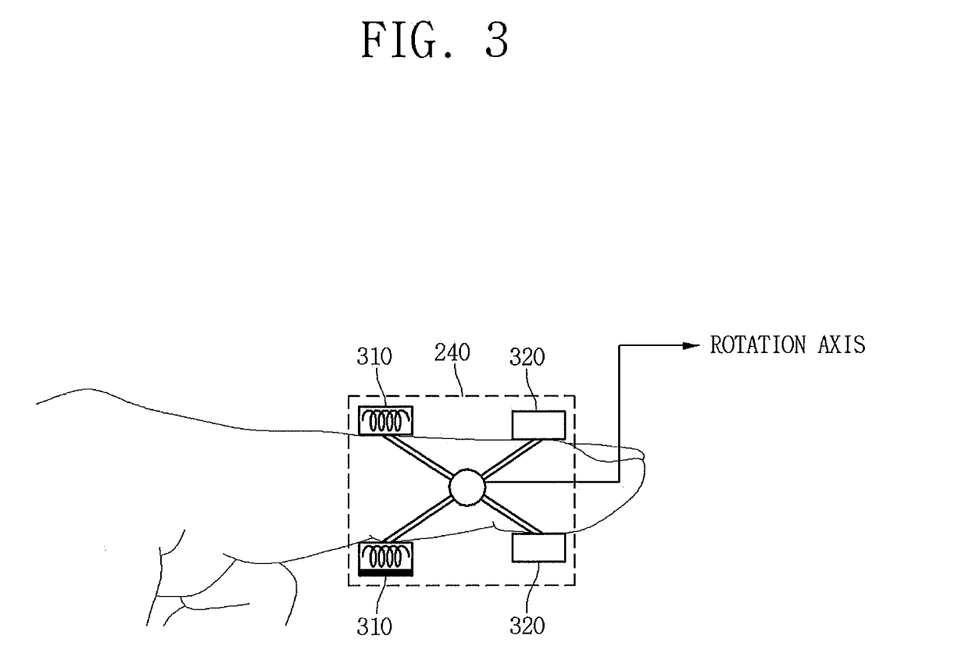
FIG. 3 explains a configuration of a torque-applying unit in accordance with one example embodiment of the present invention.

FIG. 3 explains a configuration of a torque-applying part in accordance with one example embodiment of the present invention.

In accordance with one example embodiment of the present invention, the torque-applying units included in the torque-applying part 240 may include a coil 310 and a magnet 320, respectively.

In accordance with one example embodiment of the present invention, the coil 310 may produce a magnetic field by flowing a specific current therethrough. The torque-applying part 240 may generate the torques to be applied to the user's joints by using pulling and pushing forces from the interaction of the magnetic fields produced by the currents flowing through the coils and those by the magnets 320.

In accordance with one example embodiment of the present invention, a magnetic force of a magnetic field may be controlled by a current. For example, the magnetic force generated by the coil 310 may be defined as shown in Equation 6 as shown below.

$$m = I \times N \qquad \text{<Equation 6>}$$

where m is a magnetic force; I is a current; and N is the number of coil turns. The direction of the magnetic field may be determined under the right hand rule. Accordingly, the pulling or pushing forces acting on the joints may be adjusted depending on the direction of currents flowing through the coils 310. For example, the control part 230 may support the torque-applying units to apply either the torque of the pulling force or that of the pushing force, respectively, by adjusting the directions of the currents flowing through the coils 310.

In accordance with one example embodiment of the present invention, a force F may be generated by a magnetic force $m_1$ generated by the coil 310 and a magnetic force $m_2$ generated by the permanent magnet under Coulomb's law. Of course, "the permanent magnet" could be replaced with an electromagnet by using another coil, but explanation will be omitted herein. Equation 7 below may represent relationships among $m_1$, $m_2$, and F.

$$F = 6.33 \times 10^4 \times \frac{m_1 m_2}{r^2} \qquad \text{<Equation 7>}$$

where r may be a rotating radius. The rotating radius may be a distance from a rotation axis to the coil 310 or to the magnet 320.

Besides, τ, the torques working on the joints, in accordance with one example embodiment of the present invention may be calculated under Equation 8 as shown below.

$$\tau = r \times F \qquad \text{<Equation 8>}$$

In accordance with one example embodiment of the present invention, as illustrated in FIG. 3, each of the torque-applying units may include multiple pairs of coil and magnet. If one of the torque-applying units includes multiple pairs of coil and magnet, the multiple coils and magnets may be used to generate pulling forces or pushing forces. At the time, all the torques may be a total of torque components generated by all the pairs of coil and magnet 320. Of course, one of the torque-applying units could be also configured by using only one pair of coil and magnet.

By referring to FIG. 3, it is illustrated that each of the torque-applying units includes two pairs of coil and magnet. Among them, one pair of coil and magnet may be placed on a side where a joint is bent, e.g., a palm side, and the other pair of coil and magnet may be placed on the opposite side, e.g., the back of the hand. The two pairs of coil and magnet may be placed each other in center of a joint. The two pairs of coil and magnet could apply the torques to the corresponding joint in opposite directions with each other. In other words, when the torque-applying unit on the palm side generates a pulling force, and the torque-applying unit on the side of the back of the hand generates a pushing force, the corresponding finger joint could be bent inwardly with a larger value of torque.

In accordance with one example embodiment of the present invention, a device with a proper structure is required to actually apply the torques to the user's joints. In other words, the torque-applying part 240 may have a structure appropriate to apply the torques to the joints. For instance, the torque-applying part 240 may have the torque-applying units with a shape of rings or a glove to apply the torques to the user's finger joints. The ring-shaped torque-applying part 240 may be worn on each finger joint. Or the glove-shaped torque-applying part 240 may be worn on the user's hand such that the torques are applied to the individual finger joints of the user's hand. After the apparatus 200 capable of applying the torques to the individual finger joints is worn on the hand or the fingers, if the torques is generated by an interaction between the coils 310 and the magnets 320, the user's hand or fingers may be moved according to the generated torques. Besides, the user may feel a sensation as if the user grabbed an object through the torques.

Figure 4A:
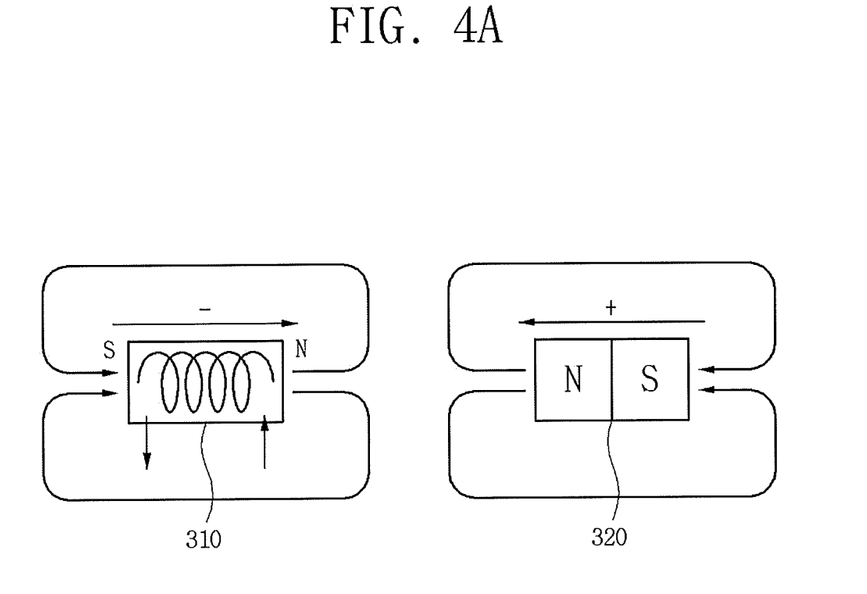
FIGS. 4A and 4B explain how to create torque by using interaction between a coil and a magnet.
Figure 4B:
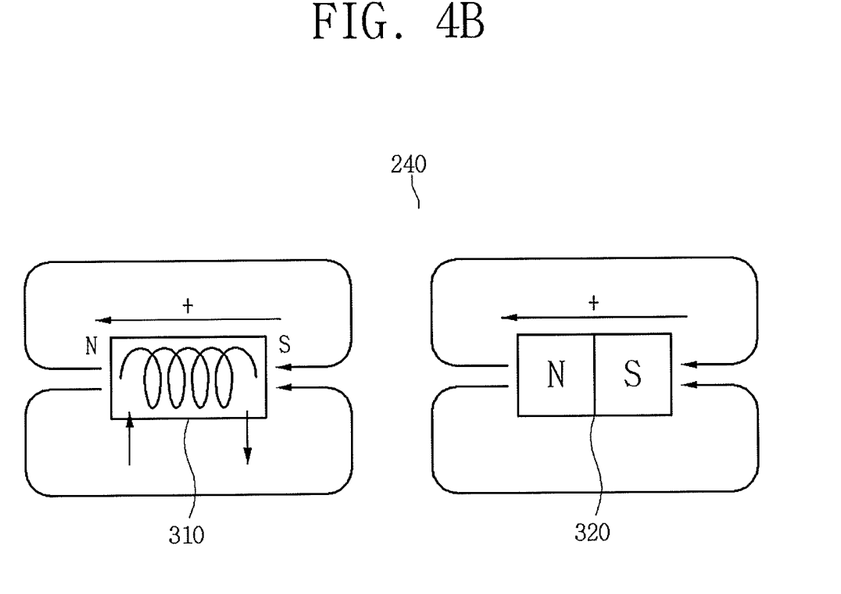

FIGS. 4A and 4B explain how to create torque by controlling a magnetic field due to a direction of current and that generated by a magnet.

FIG. 4A illustrates that a current flows through the coil 310 in a certain direction and FIG. 4B shows that a current flows through the coil 310 in a direction opposite to that in FIG. 4A.

In accordance with one example embodiment of the present invention, if either of the N and S poles of the magnet is considered as plus (+), and the other pole is as minus (−), signs of $m_1$ and $m_2$ of the Equation 7 above may be decided. In FIGS. 4A and 4B, the N pole and the S pole are set as plus (+) and minus (−), respectively.

In FIGS. 4A and 4B, it is assumed that, if the magnet 320 is on the right of the coil 310, there are the N pole of the magnet 320 near the coil 310 and the S pole thereof far from the coil 310. Meanwhile, if the current flows through the coil 310, the direction of the magnetic force may be decided depending on a direction in which the coil is wound and under the right hand rule. For example, it can be found in FIG. 4A that a pushing force is generated between a magnet field formed around a coil and that of the magnet 320 under the right hand rule and it can be found in FIG. 4B that a pulling force is generated.

Accordingly, a size and a direction of a force between the coil 310 and the magnet 320 may be adjusted by controlling a strength and a direction of a current flowing through the coil 310.

Figure 5:
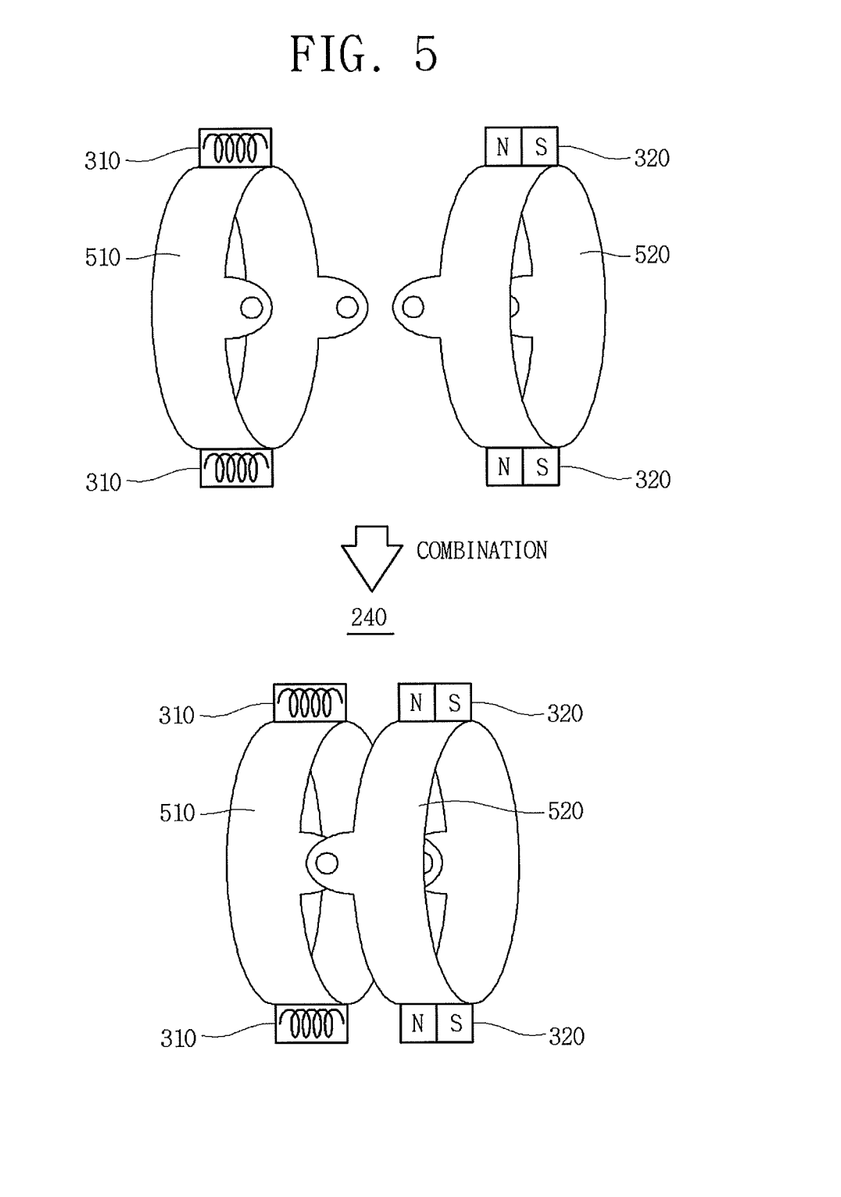
FIG. 5 illustrates a ring-shaped torque-applying unit in accordance with one example embodiment of the present invention.

FIG. 5 illustrates a ring-shaped torque-applying unit in accordance with one example embodiment of the present invention.

The torque-applying unit could have a shape of ring which is put on a position of the user's finger joint and worn on the joint.

For rotation in center of a rotation axis, the torque-applying part 240 may include a first ring 510 and a second ring 520. For example, the coil 310 may be attached to the first ring 510 and the magnet 320 may be attached to the second ring 520. In FIG. 5, a state before the first ring 510 and the second ring 520 are combined with each other is illustrated in the upper drawing and a state after the combination of the first ring 510 and the second ring 520 is shown in the lower drawing.

The first ring 510 and the second ring 520 may have a bulge, respectively. There may be two bulges, and the two bulges may be formed at opposite sides in center of the rings. The first ring 510 and the second ring 520 may be combined with each other through the bulges of the first ring 510 and the second ring 520 and the center of the combined bulges may be a central axis of rotation of the first ring 510 and the second ring 520.

Figure 6:
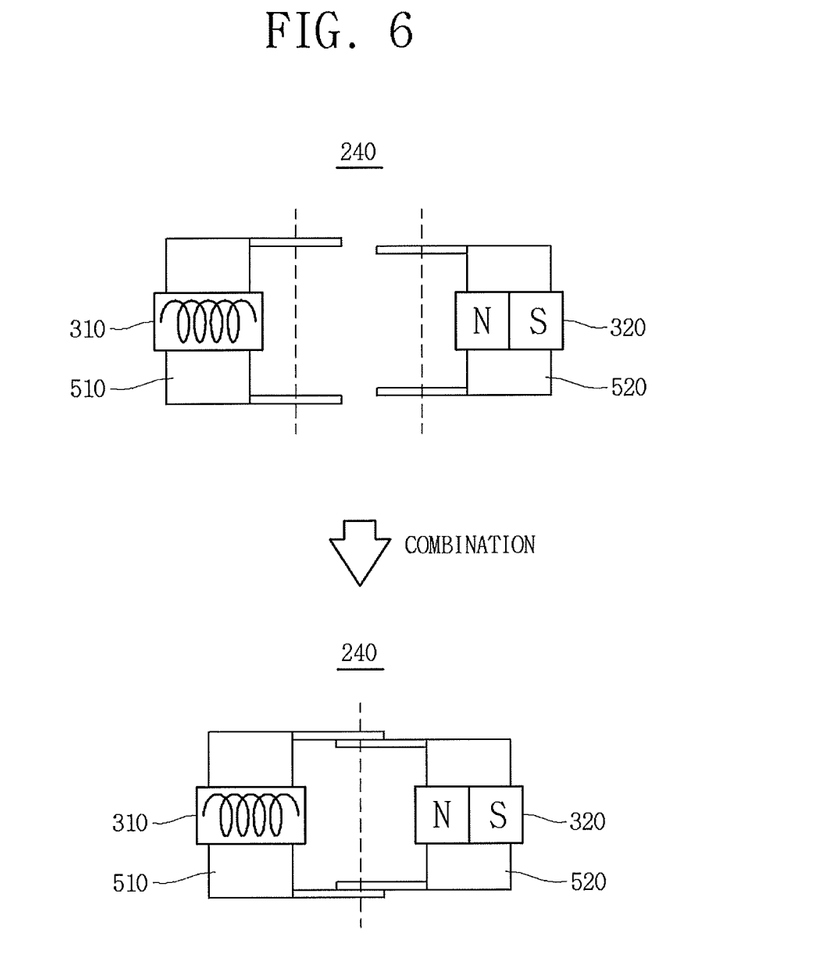
FIG. 6 illustrates a view from the top of the ring-shaped torque-applying unit in accordance with one example embodiment of the present invention.

FIG. 6 illustrates a floor plan of the ring-shaped torque-applying part in accordance with one example embodiment of the present invention.

FIG. 6 illustrates a view from the top of the ring-shaped torque-applying part 240 of FIG. 5. In FIG. 6, the shapes before the first ring 510 and the second ring 520 are combined and those after that are illustrated, respectively, in the upper and lower drawings.

In accordance with one example embodiment of the present invention, as explained above, as the bulges of the first ring 510 and the second ring 520 are combined with each other, the center of the combined bulges may play a rotation axis. In FIG. 6, a dashed line passing through the bulges of the first ring 510 and that of the second ring 520 may be represented as a rotation axis, and may be a virtual connection line between the first ring 510 and the second ring 520. The combination of the first ring 510 and the second ring 520 may do relative rotational movement in center of the rotation axis and the coil 310 and the magnet 320 may create a rotational force capable of rotating the first ring 510 and the second ring 520.

In accordance with one example embodiment of the present invention, the coil 310 and the magnet 320 may be attached to the outsides of the first ring 510 and the second ring 520, respectively, to prevent them from giving influence over a motion of a first finger. Besides, the coil 310 and the magnet 320 may allow the rotation axis to be rotated in a certain direction by generating a pulling force or a pushing force through an interaction.

In accordance with one example embodiment of the present invention, one torque-applying unit may include multiple pairs of the coil 310 and the magnet 320. One pair of the coil 310 and the magnet 320 may be attached to the first ring 510 and the other pair thereof to the second ring 520.

In accordance with one example embodiment of the present invention, there may be two pairs of the coil 310 and the magnet 320 as well. One of the two pairs of the coil 310 and the magnet 320 may be placed on a side where a finger joint is bent, e.g., a palm side, and the other may be placed on the site opposite to the bent side, e.g., the back of the hand. The two pairs of the coil 310 and the magnet 320 may be formed to apply the torques in opposition directions with each other against the joint. For example, currents in different directions may be provided to the two different coils. Of course, as mentioned above, the one torque-applying unit may include only one pair of the coil 310 and the magnet 320 as well. At the time, the one pair of the coil 310 and the magnet 320 could be attached side by side either on the top of the first ring 510 and the second ring 520 or on the bottom thereof.

Figure 7:
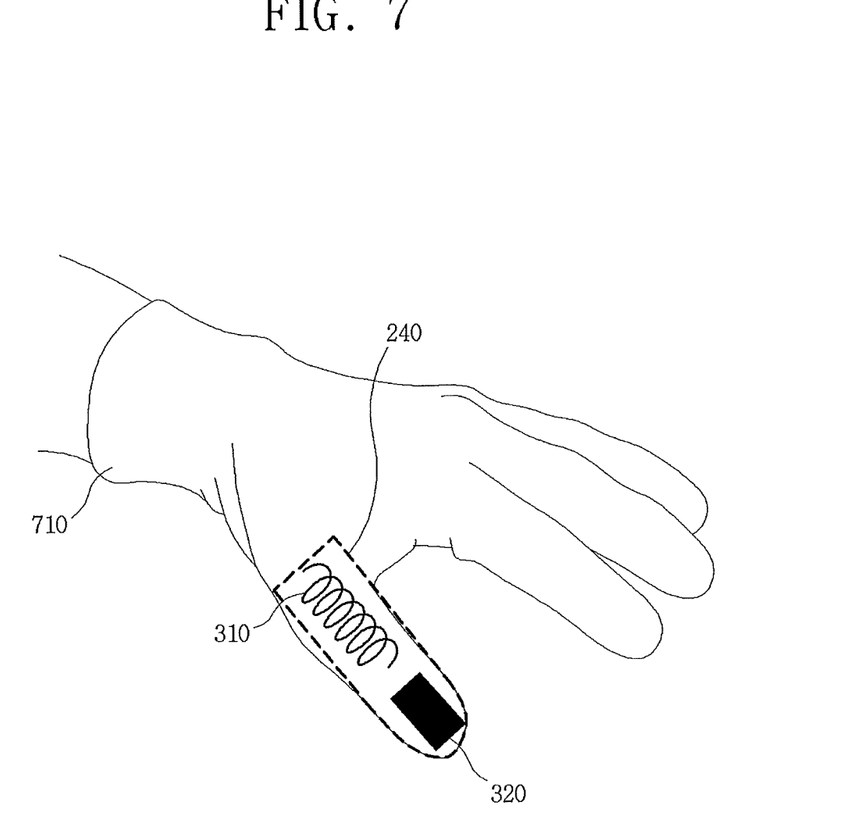
FIG. 7 shows a glove-shaped apparatus for creating torque in accordance with one example embodiment of the present invention.

FIG. 7 shows a glove-shaped apparatus for creating torques in accordance with one example embodiment of the present invention.

In accordance with one example embodiment of the present invention, the apparatus 200 may be configured by using a shape of glove. The apparatus 200 may further include a glove 710. The torque-applying units may be attached to the glove 710 such that the torque-applying units are disposed on the individual finger joints. The respective torque-applying units may be worn on the individual joints. In addition, one of the torque-applying units may have one or more pairs of the coil 310 and the magnet 320.

In accordance with one example embodiment of the present invention, if the apparatus 200 is glove-shaped, it could reduce inconvenience that might be caused while multiple rings are worn or taken off.

In accordance with the present invention, a user's body may be caused to react as if the user grabbed an object by applying the torques to the user's joints and thus the user may feel sensation as if the user grabbed an object even though the user actually does not.

In accordance with the present invention, the user may feel virtual sensation without severely limiting the user's motions.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. An apparatus for creating virtual joint sensation, comprising:
a controlling part for creating control signals for controlling respective user's joints by referring to information on torques to be applied to the respective user's joints, wherein the information on the torques is acquired by analyzing information on forces to be applied to the user's body contacting a virtual object; and a torque-applying part, including one or more torque-applying units worn on the respective user's joints, for giving the torques to the respective user's joints by using the control signals;

wherein the torque-applying units include at least one pair of coil and magnet, respectively, and the control part controls currents flowing through the coils included in the torque-applying units by using the control signals.

2. The apparatus of claim 1, further comprising: a torque-calculating part for calculating the torques to be applied to the respective user's joints by referring to the information on the forces to be applied to the user's body contacting the virtual object.

3. The apparatus of claim 1, further comprising: a force-calculating part for calculating the information on the forces to be applied to the user's body contacting the virtual object.

4. The apparatus of claim 3, wherein the force-calculating part calculates information on the forces by referring to a size and a material of the virtual object.

5. The apparatus of claim 1, wherein the forces to be applied to the user's body are converted to the torques to be applied to the respective user's joints under the Principle of Virtual Work by the following equation:

$$\tau = J^T F$$

where J is a Jacobian matrix; T represents a matrix transpose; F is a matrix of the forces to be applied to the user's body; and $\tau$ is a matrix of the torques to be applied to the respective user's joints.

6. The apparatus of claim 1, wherein the torque-applying part gives the torques to the respective user's joints by applying at least either of a pulling force and a pushing force generated by interactions of magnetic fields between the coils and the magnets due to the fact that the currents flowing through the coils are controlled by the control part.

7. The apparatus of claim 1, wherein the respective torque-applying units include multiple pairs of coil and magnet, respectively, and wherein one pair of the multiple pairs of coil and magnet is placed on the side of a joint to be bent and another pair thereof is placed on the side opposite to the joint to be bent.

8. The apparatus of claim 1, wherein the torque-applying units have a shape of ring worn on respective finger joints of the user.

9. A method for creating virtual joint sensation, comprising steps of:

(a) a controlling part creating control signals for controlling respective user's joints by referring to information on torques to be applied to the respective user's joints, wherein the information on the torques is acquired by analyzing information on forces to be applied to the user's body contacting a virtual object; and (b) a torque-applying part, including one or more torque-applying units worn on the respective user's joints, giving the torques to the respective user's joints by using the control signals;

wherein the torque-applying units include at least one pair of coil and magnet, respectively, and, at the step of (a), the control part controls currents flowing through the coils included in the torque-applying units by using the control signals.

10. The method of claim 9, further comprising a step of: a torque-calculating part calculating the torques to be applied to the respective user's joints by referring to the information on the forces to be applied to the user's body contacting the virtual object, before the step of (a).

11. The method of claim 9, further comprising a step of: a force-calculating part calculating the information on the forces to be applied to the user's body contacting the virtual object, before the step of (a).

12. The method of claim 11, wherein the force-calculating part calculates information on the forces by referring to a size and a material of the virtual object.

13. The method of claim 9, wherein the forces to be applied to the user's body are converted to the torques to be applied to the respective user's joints under the Principle of Virtual Work by the following equation:

$$\tau = J^T F$$

where J is a Jacobian matrix; T represents a matrix transpose; F is a matrix of the forces to be applied to the user's body; and $\tau$ is a matrix of the torques to be applied to the respective user's joints.

14. The method of claim 9, wherein, at the step of (b), the torque-applying part gives the torques to the respective user's joints by applying at least either of a pulling force and a pushing force generated by interactions of magnetic fields between the coils and the magnets due to the fact that the currents flowing through the coils are controlled by the control part.

15. The method of claim 9, wherein the respective torque-applying units include multiple pairs of coil and magnet, respectively, and wherein one pair of the multiple pairs of coil and magnet is placed on the side of a joint to be bent and another pair thereof is placed on the side opposite to the joint to be bent.

16. The method of claim 9, wherein the torque-applying units have a shape of ring worn on respective finger joints of the user.

* * * * *